US011226001B2

(12) United States Patent
Unno et al.

(10) Patent No.: US 11,226,001 B2
(45) Date of Patent: Jan. 18, 2022

(54) MACHINING CONTROL SYSTEM AND MOTION GUIDANCE DEVICE

(71) Applicant: THK CO., LTD., Tokyo (JP)

(72) Inventors: Akihiro Unno, Tokyo (JP); Yuki Hayashi, Tokyo (JP); Yuki Tanaka, Tokyo (JP); Tomofumi Ohashi, Tokyo (JP); Yusuke Asano, Tokyo (JP); Katsunori Kogure, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/480,143

(22) PCT Filed: Jan. 15, 2018

(86) PCT No.: PCT/JP2018/000869
§ 371 (c)(1),
(2) Date: Jul. 23, 2019

(87) PCT Pub. No.: WO2018/139236
PCT Pub. Date: Aug. 2, 2018

(65) Prior Publication Data
US 2019/0383327 A1    Dec. 19, 2019

(30) Foreign Application Priority Data
Jan. 24, 2017   (JP) .............................. JP2017-010618

(51) Int. Cl.
*G05B 19/00*       (2006.01)
*F16C 29/06*       (2006.01)
*G05B 19/402*      (2006.01)

(52) U.S. Cl.
CPC ............ *F16C 29/06* (2013.01); *G05B 19/402* (2013.01); *G05B 2219/36288* (2013.01)

(58) Field of Classification Search
CPC ........ G05B 19/402; G05B 2219/36288; G05B 19/404; G05B 19/416; F16C 29/06; F16C 41/00
See application file for complete search history.

(56) References Cited

U.S. PATENT DOCUMENTS

2002/0020243 A1*  2/2002  Ziegert ................... F16F 15/12
                                                           74/490
2003/0065419 A1*  4/2003  Fujishima ............ G05B 19/404
                                                           700/176

(Continued)

FOREIGN PATENT DOCUMENTS

JP        5-288216 A       11/1993
JP        09131634 A   *    5/1997

(Continued)

OTHER PUBLICATIONS

Machine Translation for JP-2008087092-A, obtained Jun. 2020 (Year: 2020).*

(Continued)

*Primary Examiner* — Michael D Masinick
(74) *Attorney, Agent, or Firm* — Westerman, Hattori, Daniels & Adrian, LLP

(57) ABSTRACT

A machining control system for machining of a workpiece movably supported by a motion guidance device having a track member which extends along a longitudinal direction and a moving member which is arranged so as to oppose the track member via a rolling element being rollably arranged inside a rolling groove and which is relatively movable along the longitudinal direction of the track member, the machining control system including: an acquisition unit which acquires prescribed machining information related to a load applied to the motion guidance device when machining of the workpiece is performed by the machining device; and an output unit which generates machining correction (Continued)

information for correcting a prescribed control parameter for machining of the workpiece by the machining device on the basis of the prescribed machining information acquired by the acquisition unit and which outputs the generated machining correction information to a side of the machining device.

5 Claims, 10 Drawing Sheets

(56) References Cited

U.S. PATENT DOCUMENTS

| | | | |
|---|---|---|---|
| 2013/0221069 A1 | 8/2013 | Saito et al. | |
| 2013/0345851 A1* | 12/2013 | Kataoka | G05B 19/18 700/174 |
| 2015/0105874 A1* | 4/2015 | Miyazaki | G05B 19/406 700/80 |
| 2018/0130489 A1* | 5/2018 | Cheng | B23Q 15/12 |

FOREIGN PATENT DOCUMENTS

| | | | | |
|---|---|---|---|---|
| JP | 2003-108206 A | | 4/2003 | |
| JP | 2006-031122 A | | 2/2006 | |
| JP | 2008087092 A | * | 4/2008 | |
| JP | 2011-226956 A | | 11/2011 | |
| JP | 2011226956 A | * | 11/2011 | C25D 11/18 |
| JP | 5288216 B2 | * | 9/2013 | C25D 11/18 |
| JP | 2015-27701 A | | 2/2015 | |
| JP | 2015-218888 A | | 12/2015 | |
| WO | WO-2014064953 A1 | * | 5/2014 | B23Q 15/12 |

OTHER PUBLICATIONS

Machine Translation for JP-2011226956-A, obtained Jun. 2020 (Year: 2020).*
Machine Translation for JP-5288216-B2, obtained Jun. 2020 (Year: 2020).*
Machine Translation for JP-09131634-A, obtained Jan. 2021 (Year: 2021).*
Machine Translation for WO-2014064953-A1, obtained May 2021 (Year: 2021).*
Sims, Neil D. "The self-excitation damping ratio: a chatter criterion for time-domain milling simulations." (2005): 433-445. (Year: 2005).*
Cao, Hongrui, Bing Li, and Zhengjia He. "Chatter stability of milling with speed-varying dynamics of spindles." International Journal of Machine Tools and Manufacture 52.1 (2012): 50-58. (Year: 2012).*
International Search Report dated Mar. 27, 2018, issued in counterpart International Application No. PCT/JP2018/000869, with English Translation. (3 pages).
Office Action dated May 11, 2021, issued in counterpart JP Application No. 2017-010618, with English translation. (8 pages).

* cited by examiner

ENLARGED VIEW OF PART B

MACHINING CONTROL SYSTEM AND MOTION GUIDANCE DEVICE

TECHNICAL FIELD

The present invention relates to a machining control system which controls machining of a workpiece by a machining device in a state where the workpiece is movably supported by a motion guidance device having a track member and a moving member, and to a motion guidance device.

BACKGROUND ART

A motion guidance device which movably supports a workpiece is sometimes used in a machine tool which performs turning, grinding, milling, and the like of the workpiece with a machining device. As the motion guidance device in such a case, for example, a known motion guidance device has a track member which extends along a longitudinal direction and a moving member which is arranged so as to oppose the track member via a rolling element being rollably arranged inside a rolling groove and which is relatively movable along the longitudinal direction of the track member. A machine tool using such a motion guidance device movably supports a workpiece by attaching a machining table to the moving member and placing the workpiece on the table.

CITATION LIST

Patent Literature

[PTL 1] Japanese Patent Application Laid-open No. 2015-027701

SUMMARY OF INVENTION

Technical Problem

In the motion guidance device described above, when a load is applied to the motion guidance device from the machining device when machining of a workpiece is performed by the machining device, the moving member having received a part of the load elastically deforms and thereby a load vibration is generated. When rigidity of the moving member declines over time during the use of the motion guidance device, a damping ratio of the load vibration described above concomitantly decreases over time. When the damping ratio of the load vibration described above is small, it is more difficult to dampen the load vibration of the moving member during machining of a workpiece by the machining device as compared to when the damping ratio of the load vibration is large. Therefore, as the damping ratio of the load vibration described above decreases in accordance with a change over time of the motion guidance device, it becomes difficult to stabilize an attitude of the workpiece supported by the motion guidance device and a machining accuracy of the workpiece by the machining device may be affected.

The present invention has been made in consideration of the circumstances described above, and an object thereof is to suppress a decline in machining accuracy when performing machining of a workpiece by a machining device in a state where the workpiece is movably supported by a motion guidance device.

Solution to Problem

In order to solve the problem described above, the present invention adopts a configuration capable of, when performing machining of a workpiece with a machining device in a state where the workpiece is movably supported by a motion guidance device, acquiring prescribed machining information related to a load applied to the motion guidance device and generating machining correction information for connecting a control parameter of the machining device on the basis of the acquired prescribed machining information. In addition, by outputting the generated machining correction information to a side of the machining device, the configuration enables the control parameter to be corrected by the side of the machining device.

Specifically, the present invention is a machining control system related to machining of a workpiece performed by a machining device in a state where the workpiece is movably supported by a motion guidance device having a track member which extends along a longitudinal direction and a moving member which is arranged so as to oppose the track member via a rolling element being rollably arranged inside a rolling groove and which is relatively movable along the longitudinal direction of the track member. The machining control system includes: the motion guidance device; a table on which the workpiece is to be placed, the table being supported by the motion guidance device; an acquisition unit configured to acquire prescribed machining information related to a load applied to the motion guidance device by the machining device in a state where the workpiece is placed on the table; and an output unit which generate; configured to generate machining correction information for correcting a prescribed control parameter for machining of the workpiece by the machining device on the basis of the prescribed machining information acquired by the acquisition unit and to output the generated machining correction information to a side of the machining device.

In the machining control system configured as described above, prescribed machining information related to a load applied to the motion guidance device by the machining device in a state where the workpiece is placed on the table is acquired. In specifying a damping ratio or the like of a load vibration generated in the moving member when a load is applied to the motion guidance device by the machining device in a state where the workpiece is placed on the table, it is necessary to assess the load described above. In consideration thereof, in the machining control system according to the present invention, information related to a load applied to the motion guidance device by the machining device in a state where the workpiece is placed on the table is acquired as prescribed machining information. The prescribed machining information is used to generate machining correction information. The machining correction information is information for correcting a parameter to be used to control the machining device when performing machining of the workpiece with the machining device. In addition, the machining control system according to the present invention outputs the generated machining correction information to the side of the machining device from the output unit. As a result, the side of the machining device can correct a control parameter using the machining correction information. Therefore, even when rigidity of the moving member changes due to a change over time of the motion guidance device or the like, a decline in machining accuracy of a workpiece by the machining device can be suppressed.

Advantageous Effects of Invention

According to the present invention, a decline in machining accuracy can be suppressed when performing machining of a workpiece by a machining device in a state where the workpiece is movably supported by a motion guidance device.

DESCRIPTION OF EMBODIMENT

Hereinafter, a specific embodiment of the present invention will be described with reference to the drawings. It is to be understood that dimensions, materials, shapes, relative arrangements, and the like of components described in the present embodiment are not intended to limit the technical scope of the invention thereto unless otherwise noted.

First Embodiment

Figure 1:
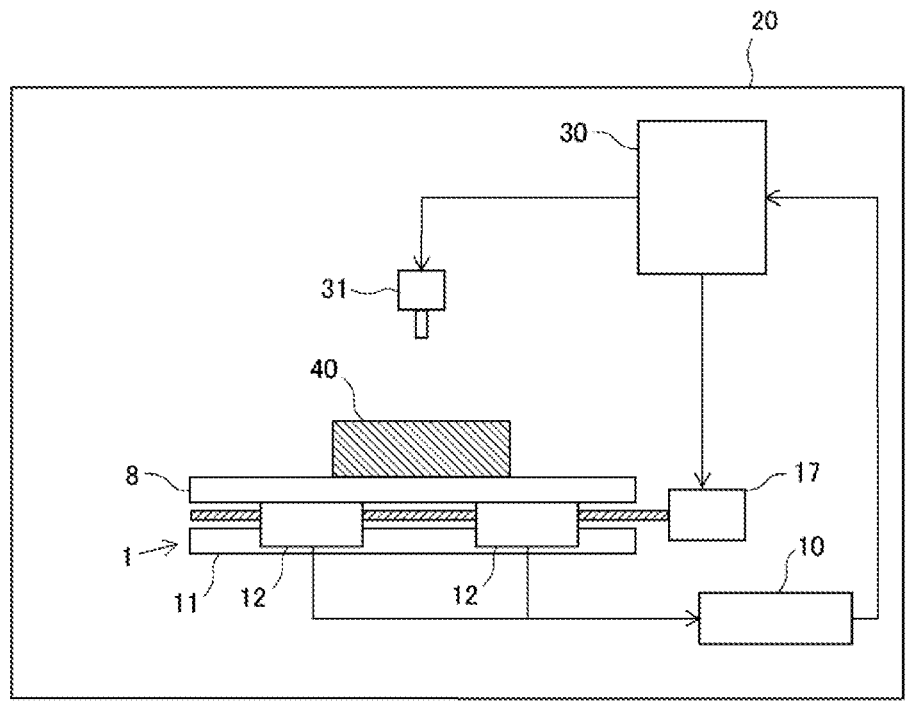
FIG. 1 is a diagram showing a schematic configuration of a machining control system according to the present invention.

FIG. 1 is a diagram showing a schematic configuration of a machine tool 20 to which a machining control system according to the present invention is applied. The machine tool 20 includes a machining tool 31 for performing turning, grinding, slicing, and the like of a workpiece 40, a table 8 on which the workpiece 40 is to be placed, an actuator 17 for feeding the table 8, and an NC device 30 for controlling a machining speed of the workpiece 40 by the machining tool 31 (for example, a rotational speed of a spindle), a feed speed of the table 8 by the actuator 17, and the like. The machine tool 20 is an example of the "machining device" as described in the present application.

In addition, a motion guidance device 1 for movably supporting the table 8 is used in the machine tool 20 described above. A structure of the motion guidance device 1 and a flow of information and the like on the basis of detected values of displacement sensors mounted to the motion guidance device 1 will now be described with reference to FIGS. 2 to 5. In the motion guidance device 1, reference characters 2a to 2d and 3a to 3d denote displacement sensors, a reference character 4 denotes a linear encoder, and a reference character 10 denotes an information processing device.

First, a configuration of the motion guidance device 1 will be described. The motion guidance device 1 includes a rail 11 (an example of a "track member" as described in the present application), a carriage 12 (an example of a "moving member" as described in the present application) which is assembled so as to be relatively movable along a longitudinal direction of the rail 11, and an information processing device 10 for processing signals of the linear encoder 4 and the displacement sensors 2a, 2b, 3a, and 3b. In the present embodiment, the rail 11 is mounted to a base 7 of the machine tool 20 and the table 8 (refer to FIG. 1) of the machine tool 20 is mounted to the carriage 12. A direction of moment of a movable part including the table 8 is guided by the motion guidance device 1. It should be noted that the motion guidance device 1 can be vertically flipped and have the carriage 12 mounted to the base 7 and the rail 11 mounted to the table 8. In addition, the motion guidance device 1 may be used in a state where the longitudinal direction of the rail 11 is inclined or perpendicular with respect to a horizontal plane instead of being horizontal.

Figure 2:
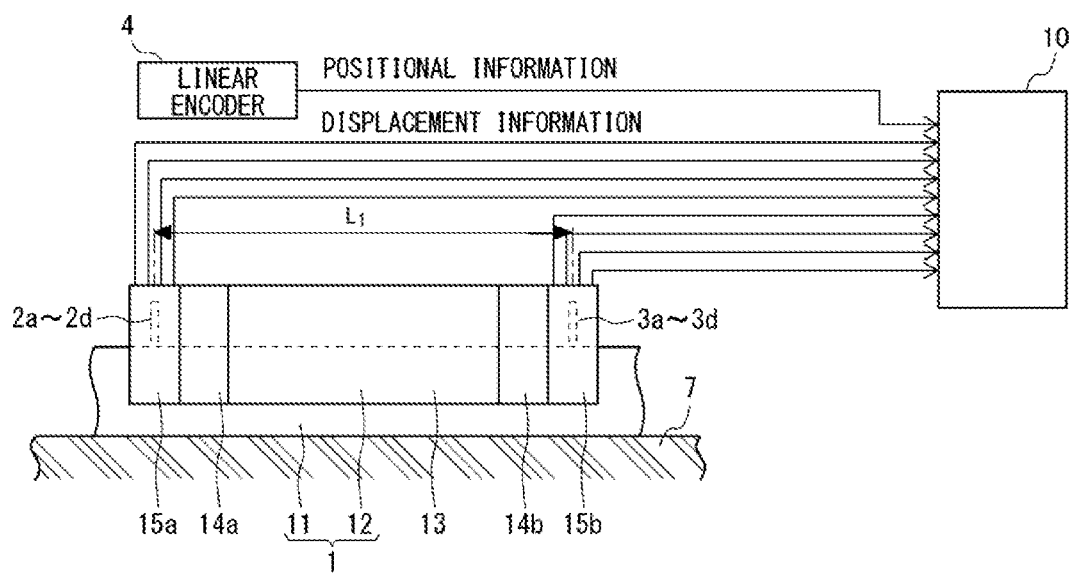
FIG. 2 is a diagram showing a schematic configuration of a motion guidance device.
Figure 3:
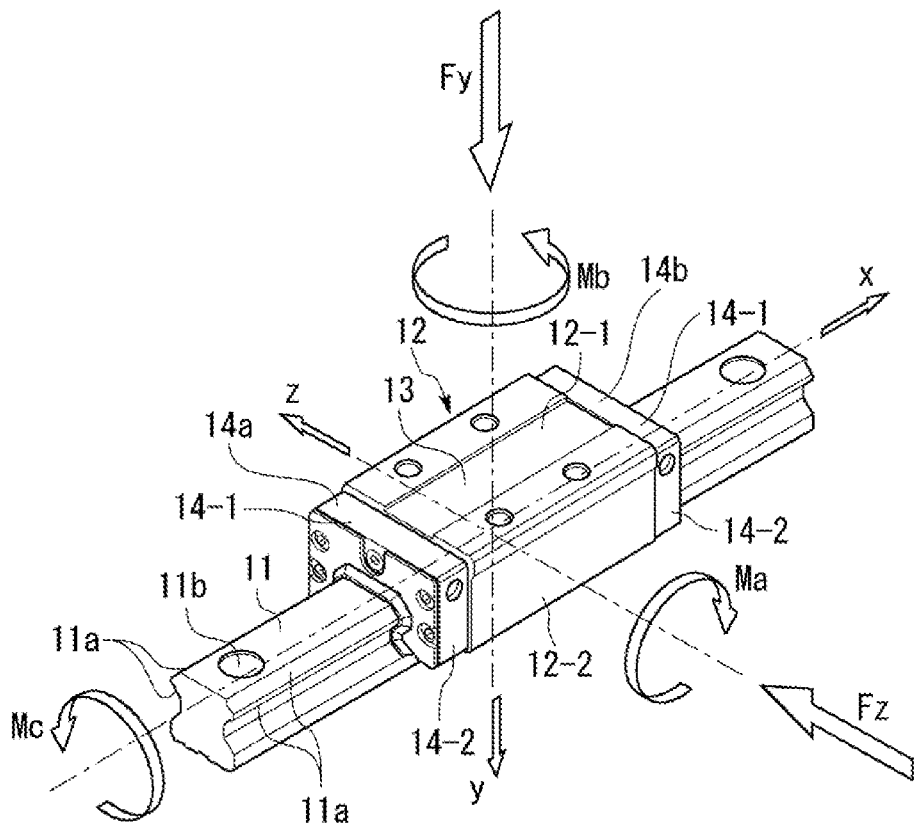
FIG. 3 is an external perspective view of a rail and a carriage included in a motion guidance device according to the present embodiment.

FIG. 3 shows an external perspective view of the rail 11 and the carriage 12 of the motion guidance device 1. For the purpose of illustration, the configuration of the motion guidance device 1 will be described on the assumption that the rail 11 is arranged on a horizontal plane, a direction viewed from the longitudinal direction of the rail 11 or, in other words, an x axis shown in FIG. 3 is a front-back direction, a y axis shown in FIG. 2 is a vertical direction, and a z axis shown in FIG. 2 is a horizontal direction. It is needless to say that an arrangement of the motion guidance device 1 is not limited to this arrangement.

Two (upper and lower) band-like rolling surfaces 11a are provided on each of left and right sides of the rail 11. The rolling surface 11a has an arc-like cross section. Through-holes 11b through which a fastening member for fastening the rail 11 to the base 7 is passed are provided at an appropriate pitch along the longitudinal direction on an upper surface of the rail 11.

The carriage 12 has a C-shaped cross section constituted by a horizontal part 12-1 which opposes the upper surface of the rail 11 and a pair of side parts 12-2 which oppose side surfaces of the rail 11. The carriage 12 includes a carriage main body 13 at center in a movement direction, a pair of lid members 14a and 14b arranged at both ends in a movement direction of the carriage main body 13, and a pair of sensor mounting members 15a and 15b (refer to FIG. 2) arranged at both ends in a movement direction of the pair of lid members 14a and 14b. The lid members 14a and 14b have a C-shaped cross section constituted by a horizontal part 14-1 which opposes the upper surface of the rail 11 and a pair of side parts 14-2 which oppose the side surfaces of the rail 11. The sensor mounting members 15a and 15b similarly have a C-shaped cross section constituted by a horizontal part 15-1 which opposes the upper surface of the rail 11 and a pair of side parts 15-2 which oppose the side surfaces of the rail 11 (refer to FIG. 5(a)). The lid members 14a and 14b are fastened to the carriage main body 13 by fastening members such as bolts. The sensor mounting members 15a and 15b are fastened to the carriage main body 13 and the lid members 14a and 14b by fastening members such as bolts. It should be noted that the sensor mounting members 15a and 15b have been omitted in FIGS. 3 and 4.

Figure 4:
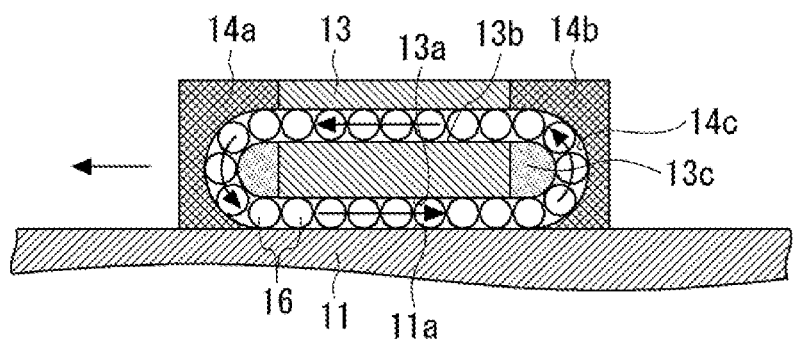
FIG. 4 is a diagram showing an outline of an internal structure of a rail and a carriage.
Figure 5:
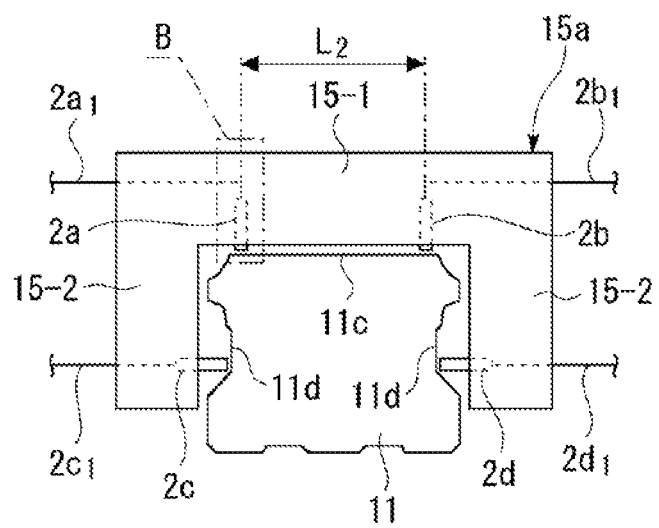
FIG. 5(a) is a front view of a motion guidance device as viewed from a longitudinal direction of a rail.
FIG. 5(b) is an enlarged view of a part B.
Figure 5:
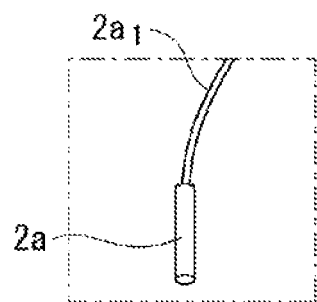

FIG. 4 is a diagram showing an outline of an internal structure of the rail 11 and the carriage 12 of the motion guidance device 1. As shown in FIG. 4, the carriage main body 13 is provided with four band-like rolling surfaces 13a which oppose the four band-like rolling surfaces 11a of the rail 11. The carriage main body 13 is provided with a return path 13b which is parallel to each rolling surface 13a. The lid members 14a and 14b are provided with U-shaped turnaround paths 14c which connect each rolling surface 13a and each return path 13b to each other. An inner circumferential side of the turnaround path 14c is constituted by an inner circumferential part 13c which has a hemispherical cross section and which is integrated with the carriage main body 13. A track-like circulatory path is constituted by a load rolling path between the rolling surface 11a of the rail 11 and the rolling surface 13a of the carriage main body 13, the pair of turnaround paths 14c, and the return path 13b. The circulatory path houses a plurality of balls 16 (an example of "rolling elements" as described in the present application). When the carriage 12 relatively moves with respect to the rail 11, the balls 16 interposed between the rail 11 and the carriage 12 roll along the load rolling path. The balls 16 having rolled to one end of the load rolling path is introduced to one of the turnaround paths 14c, advances along the return path 13b and then the other turnaround path 14c, and returns to another end of the load rolling path.

<Configuration of Sensor>

A configuration of the displacement sensors 2a to 2d and 3a to 3d which are built into the motion guidance device 1 will now be described. The displacement sensors 2a to 2d and 3a to 3d according to the present embodiment are, for example, capacitance type displacement meters and detect a displacement of the carriage 12 with respect to the rail 11 in a contact-less manner (refer to enlarged view of FIG. 5(b)). As shown in FIG. 2, the pair of sensor mounting members 15a and 15b are mounted to both ends of the carriage 12 in the movement direction. Four displacement sensors 2a to 2d are mounted to one sensor mounting member 15a. The four displacement sensors 2a to 2d are arranged at a same position in the longitudinal direction of the rail 11. Four displacement sensors 3a to 3d are similarly mounted to the other sensor mounting member 15b. The four displacement sensors 3a to 3d are arranged at a same position in the longitudinal direction of the rail 11. A distance between the displacement sensors 2a to 2d and the displacement sensors 3a to 3d in the longitudinal direction of the rail 11 is denoted by $L_1$ (refer to FIG. 2). Alternatively, the respective displacement sensors 2a to 2d and 3a to 3d can also be arranged in a staggered manner along the movement direction of the carriage 12.

FIG. 5(a) shows the sensor mounting member 15a as viewed from the longitudinal direction of the rail 11. As described above, the sensor mounting member 15a has the horizontal part 15-1 which opposes an upper surface 11c of the rail 11 and the pair of side parts 15-2 which oppose the left and right side surfaces of the rail 11. Two displacement sensors 2a and 2b which detect a displacement in a radial direction are arranged in the horizontal part 15-1. The displacement sensors 2a and 2b face each other across a gap on the upper surface 11c of the rail 11 and detect a gap to the upper surface 11c of the rail 11. A distance between the two displacement sensors 2a and 2b in the horizontal direction is denoted by L2.

Two displacement sensors 2c and 2d which detect a displacement in the horizontal direction are arranged in the pair of side parts 15-2. The displacement sensors 2c and 2d face each other across a gap on a side surface lid of the rail 11 and detect a gap to the side surface 11d.

In a state where the rail 11 is assumed to be arranged on a horizontal plane, the sensors 2a and 2b and the displacement sensors 2c and 2d are arranged lower than an upper surface (a mounting surface) of the carriage 12. This arrangement is adopted in order to allow the table 8 to be mounted on the upper surface (the mounting surface) of the carriage 12. Cables 2a1 to 2d1 of the displacement sensors 2a to 2d are drawn out in the horizontal direction from the side part 15-2 of the sensor mounting member 15a. Alternatively, the cables 2a1 to 2d1 can be drawn out toward the front (in a direction perpendicular to a paper plane) from a front surface of the sensor mounting member 15a. In addition, a height of an upper surface of the sensor mounting member 15a can be set lower than the upper surface (the mounting surface) of the carriage 12 and a gap between the upper surface of the sensor mounting member 15a and the table 8 can be utilized as a gap for drawing out the cables 2a1 and 2b1.

In a similar manner to the sensor mounting member 15a, the sensor mounting member 15b shown in FIG. 2 has the horizontal part 15-1 and the pair of side parts 15-2, and the displacement sensors 3a to 3d are arranged at positions respectively corresponding to the displacement sensors 2a to 2d.

<Configuration of Linear Encoder>

The linear encoder 4 detects a position of the carriage 12 in an x axis direction and outputs a result of the detection to the information processing device 10. For example, the linear encoder 4 includes a scale which is mounted to the base 7 of the machine tool 20 or the rail 11 and a head which is mounted to the table 8 of the machine tool 20 or the carriage 12 and which reads the scale. It should be noted that position detecting means which detects a position of the carriage 12 on the rail 11 is not limited to a linear encoder. For example, when the table 8 of the machine tool 20 is ball screw-driven, a rotary encoder which detects an angle of a motor for driving a ball screw can be used as the position detecting means.

<Functional Configuration of Information Processing Device>

Figure 6:
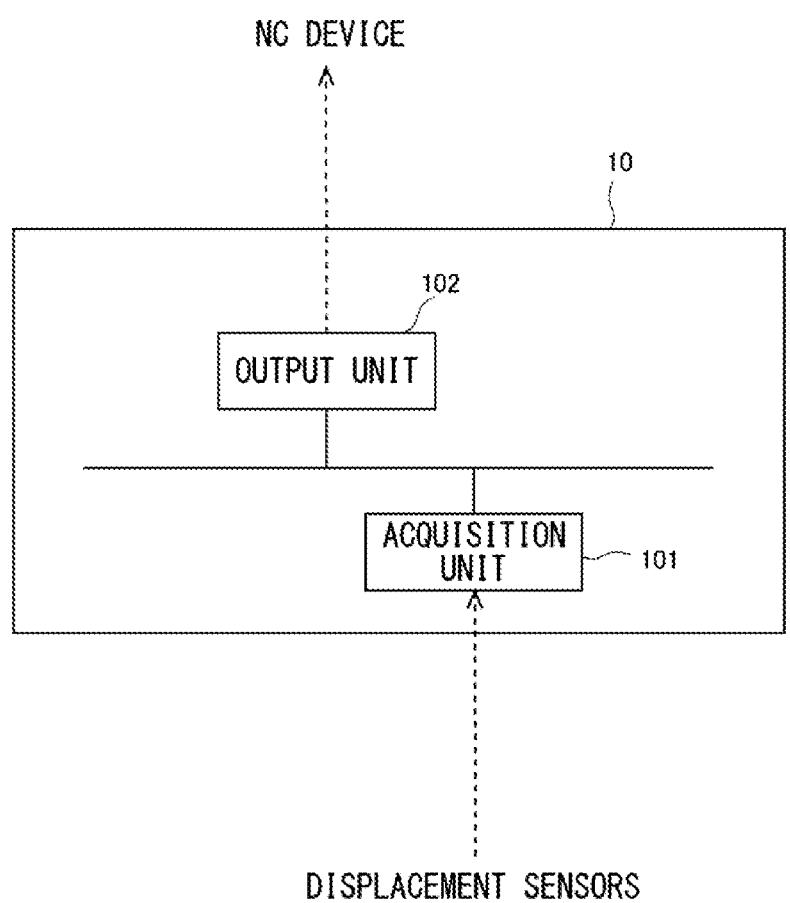
FIG. 6 is a diagram visualizing functional units realized by an information processing device included in a motion guidance device.

FIG. 6 is a block diagram visualizing functional units realized by the information processing device 10 which is included in the motion guidance device 1. The information processing device 10 includes an arithmetic processing device for processing and a memory for temporarily storing detected values of the displacement sensor 2a and the like, and various functions are exhibited when the arithmetic processing device executes a prescribed control program. As main functional units thereof, the information processing device 10 according to the present embodiment includes an acquisition unit 101 and an output unit 102.

When a load is applied to the motion guidance device 1 in a state where the workpiece 40 is placed on the table 8, the acquisition unit 101 inputs detected values of the displacement sensors 2a to 2d and 3a to 3d and acquires prescribed machining information from the detected values. The prescribed machining information is information related to the load described above of which details will be provided later.

When machining of the workpiece 40 by the machining tool 31 is performed, the load applied to the motion guidance device 1 from the machining tool 31 via the workpiece 40 and the table 8 causes the carriage 12 to elastically deform, and thereby a load vibration of the carriage 12 to be generated. In order to accurately perform machining of the workpiece 40 by the machining tool 31, an attitude of the workpiece 40 is desirably stabilized by causing the load vibration to be quickly dampened. Therefore, the carriage 12 is designed to have rigidity that more or less enables the load vibration to be quickly dampened.

The rigidity of the carriage 12 may decrease with the passage of time in accordance with a change over time of the motion guidance device 1 attributable to the machine tool 20 being repetitively operated. When the rigidity of the carriage 12 decreases, since an amount of elastic deformation of the carriage 12 when the load is applied to the motion guidance device 1 from the machining tool 31 is likely to increase, an amplitude of the load vibration described above may increase and a damping ratio of the load vibration may decrease. In such a case, since stabilizing the attitudes of the table 8 and the workpiece 40 being supported by the carriage 12 becomes difficult, a machining accuracy of the workpiece 40 by the machining tool 31 may possibly decline.

In consideration thereof, in the present embodiment, as the prescribed machining information, a magnitude of the load described above is acquired and, furthermore, the rigidity of the carriage 12 and the damping ratio of the load vibration are acquired on the basis of the magnitude of the load. A specific method of acquiring these pieces of information will be described later.

In addition, on the basis of the prescribed machining information acquired by the acquisition unit 101, the output unit 102 generates machining correction information for correcting a control parameter to be used when the NC device 30 controls the machining tool 31, and outputs the machining correction information to the NC device 30. Details of the machining correction information will be described later.

<Details of Acquisition Unit 101>

Figure 7:
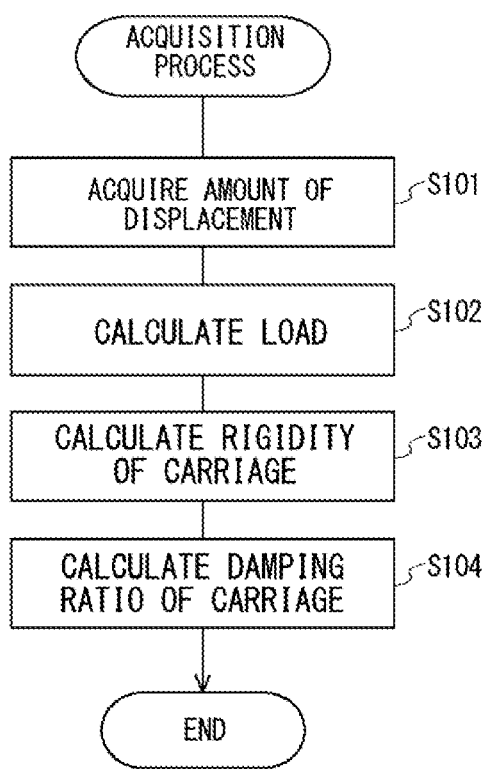
FIG. 7 is a diagram showing a flow of a process for forming prescribed machining information in a motion guidance device.

An outline of an acquisition process of the prescribed machining information by the acquisition unit 101 will now be described with reference to FIG. 7. The acquisition process shown in FIG. 7 is a process which is triggered by the start of machining of the workpiece 40 by the machining tool 31 and which is executed by the acquisition unit 101. First, the acquisition unit 101 acquires an amount of displacement of the carriage 12 from the respective displacement sensors 2a to 2d and 3a to 3d (S101). Subsequently, on the basis of data of the amount of displacement of the carriage 12 acquired in step S101, the acquisition unit 101 calculates a load acting on the carriage 12 (S102). In addition, the acquisition unit 101 calculates a rigidity of the carriage 12 from the amount of displacement acquired in S101 and the load calculated in S102 (S103). Furthermore, the acquisition unit 101 calculates a damping ratio of the load on the basis of the rigidity of the carriage 12 calculated in S103.

Next, details of processes of the respective steps in the acquisition process described above will be provided.

<S101>

In S101, with the start of machining of the workpiece 40 by the machining tool 31 as a trigger, the acquisition unit 101 acquires an amount of displacement of the carriage 12 from the respective displacement sensors 2a to 2d and 3a to 3d. Since a measured value of the respective displacement sensors 2a to 2d and 3a to 3d is a distance from the sensor to the rolling surface, the acquisition unit 101 acquires a value obtained by subtracting a detected value of the displacement sensors 2a to 2d and 3a to 3d in an unloaded state, which is stored in advance, from the value of the displacement information detected by the displacement sensors 2a to 2d and 3a to 3d as the amount of displacement of the carriage 12 with respect to the rail 11.

<S102>

Next, in S102, the acquisition unit 101 calculates a load applied to the carriage 12 on the basis of the amount of displacement of the carriage 12. When calculating the load applied to the carriage 12, the acquisition unit 101 first calculates five displacement components of the carriage 12 on the basis of an amount of displacement of the carriage 12 acquired from each of the displacement sensors 2a to 2d and 3a to 3d. Next, on the basis of the five displacement components, the acquisition unit 101 calculates a load acting on each of the plurality of balls 16 and a contact angle of each ball 16. Subsequently, on the basis of the load and the contact angle of each ball 16, the acquisition unit 101 calculates the load (five external force components) which acts on the carriage 12. Details of the three steps described above will be provided below.

<Step 1: Calculation of Five Displacement Components of Carriage>

As shown in FIG. 3, when x-y-z coordinate axes are set to the motion guidance device 1, loads that act on a coordinate origin of the x-y-z coordinate axes are $F_y$ denoting a radial load and $F_z$ denoting a horizontal load. The radial load is a load acting in a positive direction of the y axis shown in FIG. 3 which is a direction in which the carriage 12 is pressed against the rail 11. The horizontal load is a load acting in positive and negative directions of the z axis shown in FIG. 3 which are directions in which the carriage 12 is laterally shifted with respect to the rail 11.

In addition, moments around the x-y-z coordinate axes are $M_a$ denoting a sum of pitching moments, $M_b$ denoting a sum of yawing moments, and $M_c$ denoting a sum of rolling moments. The radial load $F_y$, the pitching moment $M_a$, the rolling moment $M_c$, the horizontal load $F_z$, and the yawing moment $M_b$ act on the carriage 12 as external forces. When these five external force components act on the carriage 12, five displacement components respectively corresponding to the five external force components or, more specifically, a radial displacement $\alpha_1$ (mm), a pitch angle $\alpha_2$ (rad), a roll angle $\alpha_3$ (rad), a horizontal displacement $\alpha_4$ (mm), and a yaw angle $\alpha_5$ (rad) are generated on the carriage 12.

Figure 8:
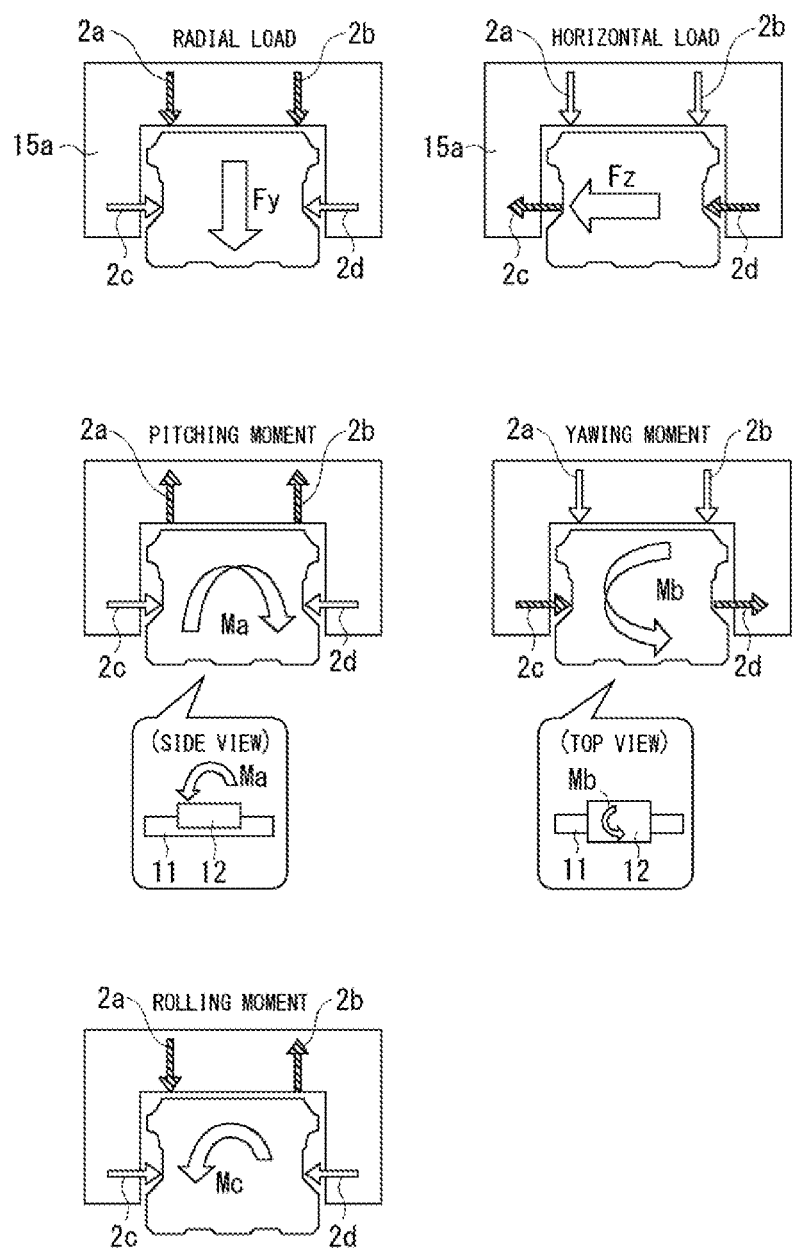
FIG. 8 is a diagram showing a change in outputs of sensors when an external force acts on a carriage.

FIG. 8 shows a change in outputs of the displacement sensors 2a to 2d when external forces act on the carriage 12. In FIG. 8, arrows with diagonal hatchings indicate sensors of which an output changes and blank arrows indicate sensors of which an output does not change. When the radial load $F_y$ acts on the carriage 12, elastic deformation of the carriage main body 13, the balls 16, and the like cause a gap in the vertical direction between the carriage 12 and the rail 11 to change in accordance with a magnitude of the radial load $F_y$. The displacement sensors 2a and 2b detect a change (a displacement) of the gap in the vertical direction. It should be noted that the displacement sensors 3a and 3b mounted to the sensor mounting member 15b (refer to FIG. 2) also detect a displacement in the vertical direction.

When the radial load $F_y$ acts on the carriage 12, for example, the radial displacement $\alpha_1$ of the carriage 12 is given by the following equation, where $A_1$ and $A_2$ denote displacements detected by the displacement sensors 2a and 2b and $A_3$ and $A_4$ denote displacements detected by the displacement sensors 3a and 3b.

$$\alpha_1 = (A_1 + A_2 + A_3 + A_4)/4 \qquad \text{(Math. 1)}$$

When the horizontal load $F_z$ acts on the carriage 12, the carriage 12 shifts laterally with respect to the rail 11 due to elastic deformation of the carriage main body 13 and the balls 16 or the like, a gap in the horizontal direction between one of the side parts 12-2 of the carriage 12 and the rail 11 decreases, and a gap in the horizontal direction between the other side part 12-2 of the carriage 12 and the rail 11 increases. The displacement sensors 2c and 2d detect such a change (a displacement) of the gap in the horizontal direction. It should be noted that the displacement sensors 3c and 3d mounted to the sensor mounting member 15b (refer to FIG. 2) also detect a displacement in the horizontal direction. The horizontal displacement $\alpha_4$ of the carriage 12 is given by the following equation, where $B_1$ and $B_2$ denote displacements detected by the displacement sensors 2c and 2d and $B_3$ and $B_4$ denote displacements detected by the displacement sensors 3c and 3d.

$$\alpha_4 = (B_1 - B_2 + B_3 - B_4)/4 \qquad \text{(Math. 2)}$$

When the pitching moment $M_a$ acts on the carriage 12, gaps between the displacement sensors 2a and 2b and the rail 11 increase and gaps between the displacement sensors 3a and 3b and the rail 11 decrease. Assuming that the pitch angle $\alpha_2$ is sufficiently small, for example, the pitch angle $\alpha_2$ (rad) is given by the following equation.

$$\alpha_2 = ((A_3 + A_4)/2 - (A_1 + A_2)/2)/L_1 \qquad \text{(Math. 3)}$$

When the rolling moment $M_c$ acts on the carriage 12, gaps between the displacement sensors 2a and 3a and the rail 11 decrease and gaps between the displacement sensors 2b and 3b and the rail 11 increase. Assuming that the roll angle $\alpha_3$ is sufficiently small, for example, the roll angle $\alpha_3$ (rad) is given by the following equation.

$$\alpha_3 = ((A_1 + A_3)/2 - (A_2 + A_4)/2)/L_2 \qquad \text{(Math. 4)}$$

When the yawing moment $M_b$ acts on the carriage 12, gaps between the displacement sensors 2c and 3d and the rail 11 decrease and gaps between the displacement sensors 2d and 3c and the rail 11 increase. Assuming that the yaw angle $\alpha_5$ is sufficiently small, for example, the yaw angle $\alpha_5$ (rad) is given by the following equation.

$$\alpha_5 = ((A_1 + A_4)/2 - (A_2 + A_3)/2)/L_2 \qquad \text{(Math. 5)}$$

As described above, the five displacement components of the carriage 12 can be calculated on the basis of displacements detected by the displacement sensors 2a to 2d and 3a to 3d.

<Step 2: Calculation of Acting Loads and Contact Angles of Each Ball>

Figure 9:
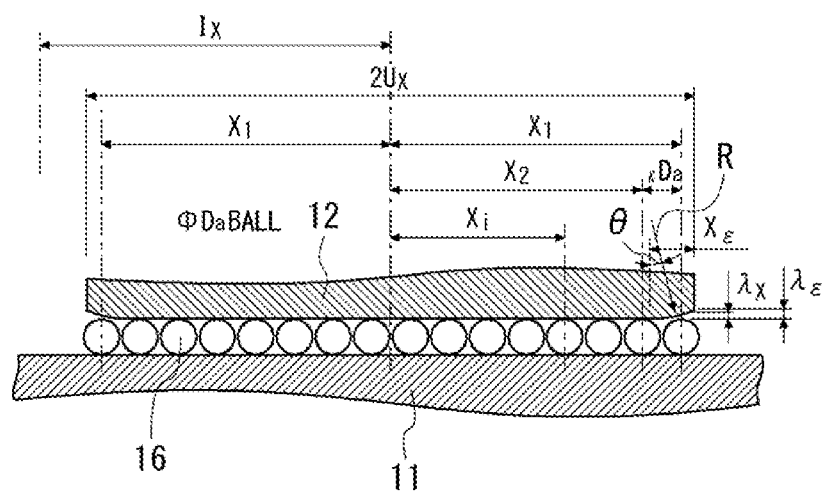
FIG. 9 is a diagram showing a portion with which balls are in contact inside a carriage.

FIG. 9 shows a state where a cross section in the x axis direction of a portion with which the balls 16 are in contact inside the carriage 12 has been taken. From FIG. 9, a pitch of the balls is denoted by $\kappa Da$ using $\kappa$ having a slightly larger value than 1 and an x coordinate of each ball is determined and denoted by $X_i$. $2U_x$ denotes a length of a portion in which the balls 16 roll inside the carriage 12. The number of balls that line up within $2U_x$ is referred to as the number of significant balls and is denoted by I. Curved surface machining with a large R-shape referred to as a crowning process is applied to both end portions of the carriage 12 so as to produce a radius of R and a depth of $\lambda_e$.

Theoretical formulas are formed on the assumption that five displacement components as the load or, in other words, the radial displacement $\alpha_1$, the pitch angle $\alpha_2$, the roll angle $\alpha_3$, the horizontal displacement $\alpha_4$, and the yaw angle $\alpha_5$ are generated on the carriage 12 when the five external force components or, in other words, the radial load $F_y$, the pitching moment $M_a$, the rolling moment $M_c$, the horizontal load $F_z$, and the yawing moment $M_b$ act on the carriage 12.

Figure 10:
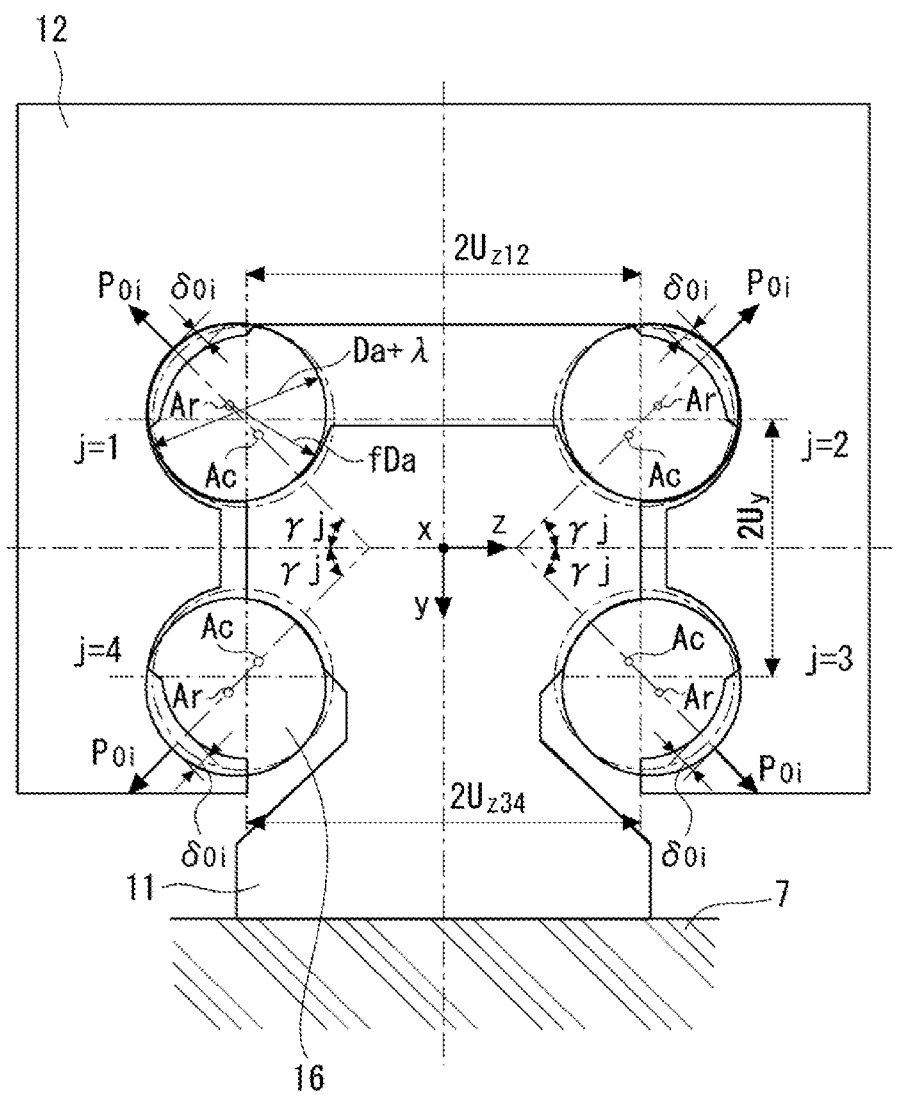
FIG. 10 is a diagram showing a state of an internal load prior to generation of five displacement components.
Figure 11:
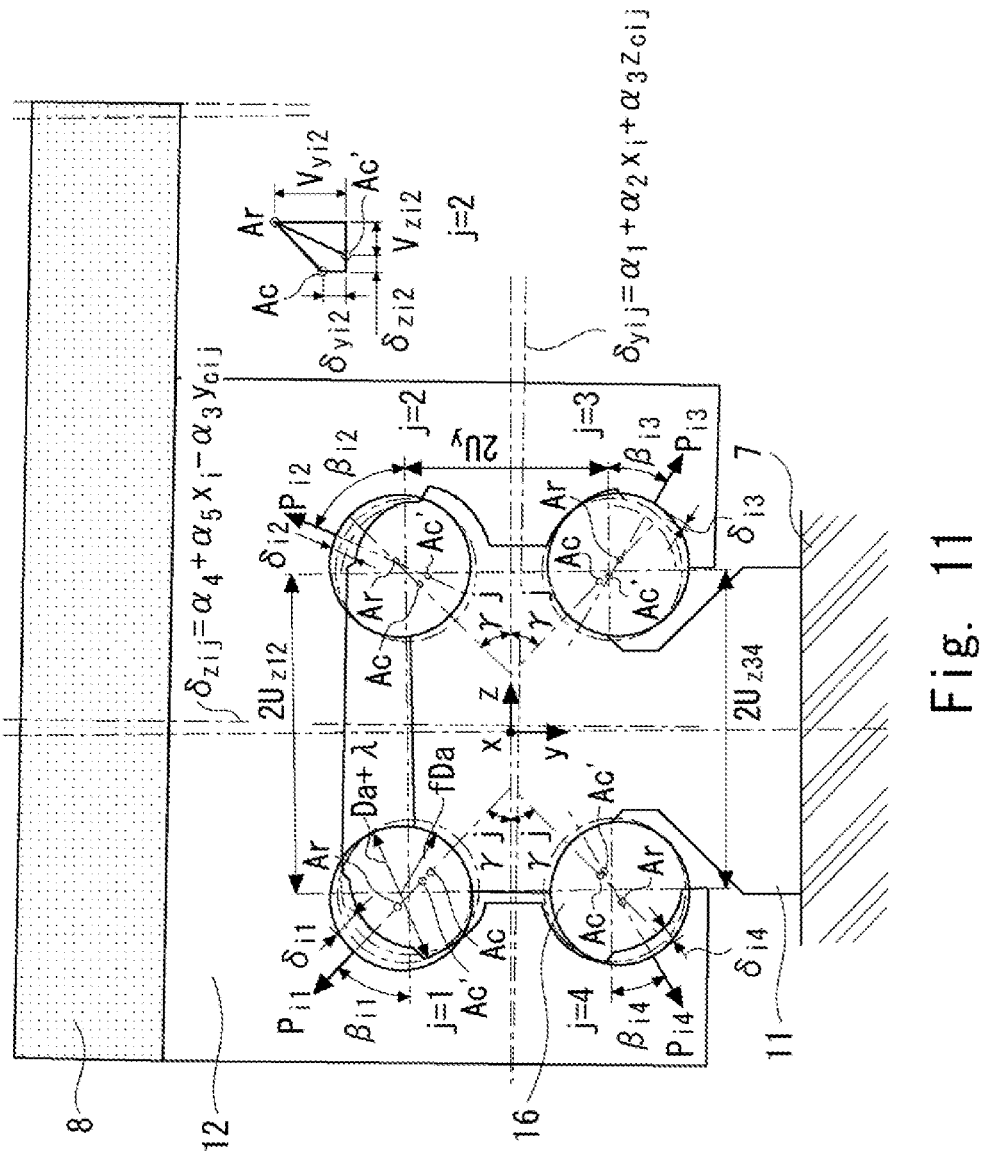
FIG. 11 is a diagram showing a state of an internal load after the generation of five displacement components.

FIG. 10 shows a state of an internal load before the five displacement components are generated and FIG. 11 shows a state of the internal load after the five displacement components are generated of a cross section in the carriage 12 at a ball number i of the carriage 12. In this case, a ball row number in the carriage 12 is denoted by j and a ball number in a ball row is denoted by i. $D_a$ denotes a ball diameter, f denotes a degree of conformance between the rolling surface and the ball 16 on both the side of the rail 11 and the side of the carriage 12, and, consequently, $fD_a$ denotes a radius of curvature of the rolling surface. In addition, $A_r$ denotes a center of curvature position of the rail-side rolling surface, $A_c$ denotes a center of curvature position of the carriage-side rolling surface, and $\gamma$ denotes an initial state of a contact angle that is an angle formed between a line connecting $A_r$ and $A_c$ and the z angle. Furthermore, $2U_{z12}$ denotes a ball-center distance between balls 16 which respectively roll on the two rolling surfaces on an upper side of the rail 11, $2U_{z34}$ denotes a ball-center distance between balls 16 which respectively roll on the two rolling surfaces on a lower side of the rail 11, and $2U_y$ denotes a ball-center distance between balls 16 which respectively roll on a rolling surface on the upper side of the rail 11 and a rolling surface on the lower side of the rail 11.

Precompression acts on the balls 16. First, a principle of precompression will be described. Dimensions of a portion sandwiched between opposing rolling surfaces of the rail 11 and the carriage 12 are determined by dimensions of the rail 11 and the carriage 12 at the time of design and by a geometric shape of the rolling surfaces. While a ball diameter that fits into the portion is a ball diameter at the time of design, when a ball 16 with a slightly larger dimension $Da+\lambda$ than the ball diameter at the time of design is assembled into the portion, according to Hertz's contact theory, the contact portion between the ball 16 and the rolling surface elastically deforms, forms a contact surface, and generates a contact stress. A load generated in this manner is an internal load that is a precompression load.

In FIG. 10, the load is denoted by $P_0$, and an amount of mutual approach between the rail 11 and the carriage 12 due to the elastic deformation of the contact portion is denoted by $\delta_0$. Although a ball position is actually at a center position between rolling surfaces of the rail 11 and the carriage 12 depicted by dashed-dotted lines in FIG. 10, since the degrees of conformance f between both rolling surfaces and the ball 16 are equal to each other, various characteristic values on the basis of Hertz's contact theory which are generated at the two contact portions of the ball 16 are the same. Therefore, the ball 16 is depicted by being moved to a position of the rail-side rolling surface in order to make the amount of mutual approach $\delta_0$ between the rolling surfaces of the rail 11 and the carriage 12 more readily understandable.

Normally, since the precompression load is defined as a radial direction load of two upper rows (or two lower rows) per one carriage, the precompression load $P_{pre}$ is expressed by the following equation.

$$P_{pre} = 2 \sum_{i=1}^{I} \sum_{j=1}^{2} P_{0i} \sin \gamma_j \qquad \text{(Math. 6)}$$

Next, a state where the load (the five external force components) have acted on the motion guidance device 1 from the state described above and the five displacement components have been generated will be described. As shown in FIG. 11, due to the five displacement components including the radial displacement $\alpha_1$, the pitch angle $\alpha_2$, the roll angle $\alpha_3$, the horizontal displacement $\alpha_4$, and the yaw angle $\alpha_5$ at a center of the motion guidance device 1 which is used as the coordinate origin, a relative displacement of the rail 11 and the carriage 12 has occurred at an i-th ball position.

At this point, while the center of curvature of the rail-side rolling surface does not move, since the carriage 12 moves, the center of curvature of the carriage-side rolling surface geometrically moves at each ball position. This situation is expressed as a movement of $A_c$ denoting the center of curvature of the carriage-side rolling surface to $A_c{}'$. When an amount of movement from $A_c$ to $A_c{}'$ is considered separately in the y direction and the z direction, an amount of movement in the y direction is denoted by $\delta_y$, an amount of movement in the z direction is denoted by $\delta_z$, and subsequent suffixes denote an i-th ball and a j-th ball row, the amounts of movement can be expressed as $$\delta_{yij} = \alpha_1 + \alpha_2 x_i + \alpha_3 z_{cij}$$

$$\delta_{zij} = \alpha_4 + \alpha_5 x_i - \alpha_3 y_{cij} \quad \text{(Math. 7)}$$

where $z_c$ and $y_c$ denote coordinates of a point $A_c$.

Next, since a line connecting centers of curvature of rolling surfaces on the side of the rail 11 and the side of the carriage 12 forms a contact angle that is a normal direction of a ball load, an initial contact angle $\gamma_j$ changes to $\beta_{ij}$ and, furthermore, a distance between the centers of curvature of both rolling surfaces changes from an initial distance between $A_r$ and $A_c$ to a distance between $A_r$ and $A_c{}'$. This change in the distance between the centers of curvature of both rolling surfaces is manifested as an elastic deformation in both contact portions of the ball 16 and, in a similar manner to the description of FIG. 10, an amount of elastic deformation $\delta_{ij}$ of the ball 16 is determined by depicting the ball 16 as being shifted to a position of the rail-side rolling surface.

When the distance between $A_r$ and $A_c{}'$ is similarly considered separately in the y direction and the z direction, the distance in the y direction is denoted by $V_y$, and the distance in the z direction is denoted by $V_z$, the distances can be expressed using $\delta_{yij}$ and $\delta_{zij}$ described earlier as follows.

$$V_{yij} = (2f-1)D_a \sin \gamma_j + \delta_{yij}$$

$$V_{zij} = (2f-1)D_a \cos \gamma_j + \delta_{zij} \quad \text{(Math. 8)}$$

Accordingly, the distance between $A_r$ and $A_c{}'$ is expressed as $$\overline{A_r A_c{}'} = (V_{yij}^2 + V_{zij}^2)^{\frac{1}{2}} \quad \text{(Math. 9)}$$

and the contact angle $\beta_{ij}$ is expressed as $$\tan \beta_{ij} = \frac{V_{yij}}{V_{zij}} \quad \text{(Math. 10)}$$

As a result, the amount of elastic deformation $\delta_{ij}$ of the ball 16 is expressed as $$\delta_{ij} = (V_{yij}^2 + V_{zij}^2)^{\frac{1}{2}} - (2f-1)D_a + \lambda - \lambda_{xi} \quad \text{(Math. 11)}$$

In the state shown in FIG. 9 where a cross section in the x axis direction of a portion with which the balls 16 are in contact inside the carriage 12 has been taken, since $A_c{}'$ being the center of curvature of the rolling surface on the side of the carriage 12 has separated from $A_c$ being the center of curvature of the rail-side rolling surface, the amount of elastic deformation $\delta_{ij}$ of the ball 16 in the machined portion subjected to crowning has decreased by an amount corresponding to the separation. Since the separation can be regarded as equivalent to a case where the ball diameter is reduced accordingly, the amount is denoted by $\lambda_{xi}$ and subtracted in the equation given above.

Using a formula expressing an amount of elastic approach in a case where a rolling element is a ball as derived from Hertz's contact theory, a rolling element load $P_{ij}$ is obtained from the amount of elastic deformation $\delta_{ij}$ by the following equation.

$$P_{ij} = C_b \delta_{ij}^{\frac{3}{2}} \quad \text{(Math. 12)}$$

where $C_b$ denotes a nonlinear spring constant (N/mm$^{3/2}$) which is given by the following equation.

$$Cb = 2^{-\frac{3}{2}} \left(\frac{2K}{\pi\mu}\right)^{-\frac{3}{2}} \left[\frac{1}{8}\left\{\frac{3}{E}\left(1 - \frac{1}{m^2}\right)\right\}^2 E_\rho\right]^{-\frac{1}{2}} \quad \text{(Math. 13)}$$

where E denotes a longitudinal elastic modulus, 1/m denotes Poisson's ratio, $2K/\pi\mu$ denotes the Hertz coefficient, and $\Sigma\rho$ denotes a sum of principal curvatures.

According to the above, the contact angle $\beta_{ij}$, the amount of elastic deformation $\delta_{ij}$, and the rolling element load $P_{ij}$ can be expressed by equations with respect to all of the balls 16 in the carriage 12 using the five displacement components $\alpha_1$ to $\alpha_5$ of the carriage 12.

It should be noted that, in the description given above, a rigid body model load distribution theory in which the carriage 12 is considered a rigid body is used for the sake of brevity. The rigid body model load distribution theory can be expanded and a carriage beam model load distribution theory to which a beam theory has been applied in order to take the deformation of the side part 12-2 of the carriage 12 into consideration can also be used. Furthermore, a carriage-rail FEM model load distribution theory in which the carriage 12 and the rail 11 are considered FEM models can also be used.

<Step 3: Calculation of Load (Five External Force Components)>

Subsequently, equilibrium condition formulas with respect to the five components as external forces or, in other words, the radial load $F_y$, the pitching moment $M_a$, the rolling moment $M_c$, the horizontal load $F_z$, and the yawing moment $M_b$ need only be set using the equations presented above.

(Math. 14)

With respect to the radial load $F_y$, $$F_y = \sum_{j=1}^{4} \sum_{i=1}^{I} P_{ij} \sin \beta_{ij} \quad \text{(Math. 15)}$$

With respect to the pitching moment $M_a$, $$M_a = \sum_{j=1}^{4} \sum_{i=1}^{I} P_{ij} \sin \beta_{ij} x_{ij} \qquad \text{(Math. 16)}$$

With respect to the rolling moment $M_c$, $$M_c = \sum_{j=1}^{4} \sum_{i=1}^{I} P_{ij} \omega_{ij}$$

where $\omega_{ij}$ denotes a length of a moment arm and is given by the following equation where $z_r$ and $y_r$ denote coordinates of a point $A_r$.

$$\omega_{ij} = z_{rif} \sin \beta_{ij} - y_{rij} \cos \beta_{ij} \qquad \text{(Math. 17)}$$

With respect to the horizontal load $F_z$, $$F_z = \sum_{j=1}^{4} \sum_{i=1}^{I} P_{ij} \cos \beta_{ij} \qquad \text{(Math. 18)}$$

$$M_b = \sum_{j=1}^{4} \sum_{i=1}^{I} P_{ij} \cos \beta_{ij} x_i$$

With respect to the yawing moment $M_b$,

Using the equations presented above, the load (the five external force components) acting on the carriage 12 can be calculated.

<S103>

Next, details of S103 will be described. In S103, the acquisition unit 101 calculates a rigidity of the carriage 12 on the basis of the five external force components and an amount of elastic deformation corresponding to each component of the five external force components. In doing so, the acquisition unit 101 is to use each component of the five displacement components acquired in S101 as the amount of elastic deformation corresponding to each component of the five external force components. Accordingly, a rigidity $k_y$ of the carriage 12 with respect to the radial load $F_y$ is expressed as $$k_y = F_y/\alpha 1. \qquad \text{(Math. 19)}$$

A rigidity $k_a$ of the carriage 12 with respect to the pitching moment $M_a$ is expressed as $$k_a = M_a/\alpha 2. \qquad \text{(Math. 20)}$$

A rigidity $k_c$ of the carriage 12 with respect to the rolling moment $M_c$ is expressed as $$k_c = M_c/\alpha 3. \qquad \text{(Math. 21)}$$

A rigidity kz of the carriage 12 with respect to the horizontal load $F_z$ is expressed as $$kz = Fz/\alpha 4. \qquad \text{(Math. 22)}$$

A rigidity $k_b$ of the carriage 12 with respect to the yawing moment $M_b$ is expressed as $$k_b = M_b/\alpha 5. \qquad \text{(Math. 23)}$$

Using the equations presented above, the rigidity (five rigidity components) of the carriage 12 can be calculated.

<S104>

Next, details of S104 will be described. In S104, the acquisition unit 101 calculates a damping ratio of the load vibration described above on the basis of the five rigidity components of the carriage 12 calculated in S103. In this case, the damping ratio of the load vibration described above correlates with the damping ratio of an elastic vibration of the carriage 12. Therefore, the damping ratio of the load vibration described above can be calculated using the rigidity of the carriage 12 and a mass of the carriage 12. For example, when the mass of the carriage 12 is denoted by q, a damping ratio $d_y$ of a radial component of the load vibration is expressed as $$d_y = \frac{c}{2\sqrt{qk_y}}, \qquad \text{(Math. 24)}$$

where c denotes a constant.

A damping ratio $d_a$ of a pitch component of the load vibration is expressed as $$d_a = \frac{c}{2\sqrt{qk_a}}. \qquad \text{(Math. 25)}$$

A damping ratio $d_c$ of a roll component of the load vibration is expressed as $$d_c = \frac{c}{2\sqrt{qk_c}}. \qquad \text{(Math. 26)}$$

A damping ratio $d_z$ of a horizontal component of the load vibration is expressed as $$d_z = \frac{c}{2\sqrt{qk_z}}. \qquad \text{(Math. 27)}$$

A damping ratio $d_b$ of a yaw component of the load vibration is expressed as $$d_b = \frac{c}{2\sqrt{qk_b}}. \qquad \text{(Math. 28)}$$

Figure 12:
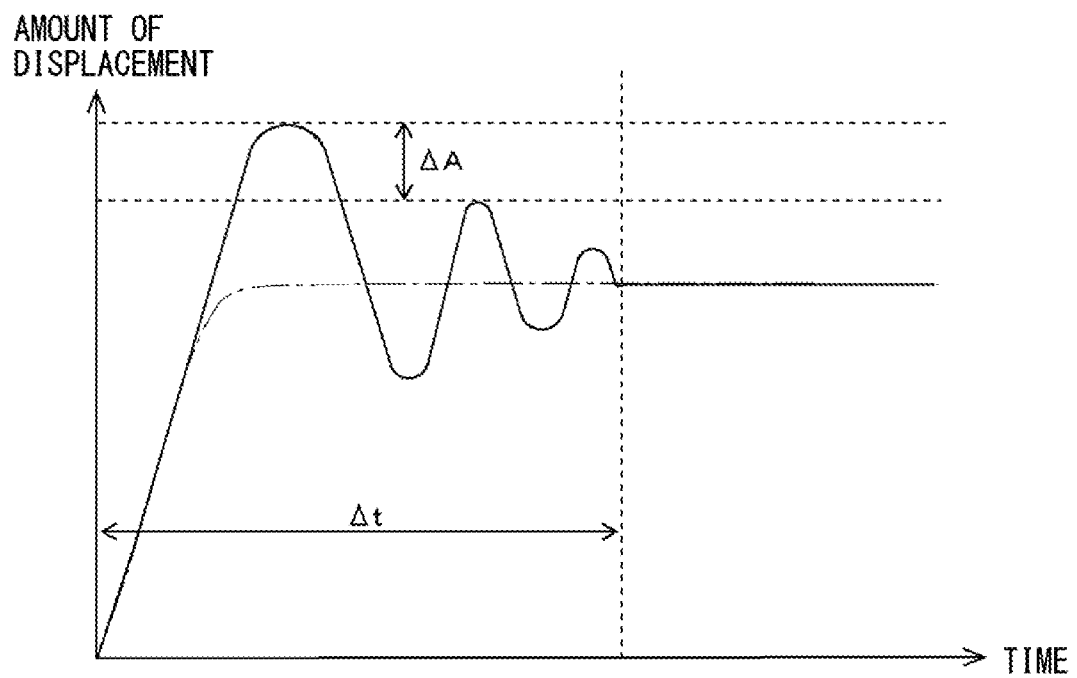
FIG. 12 is a diagram showing an example of a graph which plots displacement data of a carriage in a time series.

The acquisition unit 101 may obtain, from a waveform when displacement data is plotted on a graph having a time axis as an abscissa as shown in FIG. 12, a damping ratio of the carriage 12 from an amount of attenuation $\Delta A$ of amplitude per unit time. Alternatively, the damping ratio of the load vibration described above may be obtained on the basis of time $\Delta t2$ from the start of vibration of displacement until the vibration is dampened.

<Details of Output Unit 102>

Next, the output unit 102 generates machining correction information on the basis of rigidity data and damping ratio data of the carriage 12 which are prescribed machining information acquired by the acquisition unit 101. As described earlier, the machining correction information is information for correcting a control parameter to be used when the NC device 30 controls the machining tool 31.

Specifically, the machining correction information is information for correcting a machining speed of the workpiece 40 by the machining tool 31, information for correcting a travel speed of the carriage 12 (a feed speed of the table 8) due to the actuator 17 when machining of the workpiece 40 by the machining tool 31 is being performed, and the like. When information for correcting the machining speed of the workpiece 40 by the machining tool 31 is used as the machining correction information, the output unit 102 may generate correction information causing a correction to be made such that the smaller the rigidity of the carriage 12 and the smaller the damping ratio of the load vibration described above, the slower the machining speed. In addition, when information for correcting the feed speed of the table 8 due to the actuator 17 is used as the machining correction information, the output unit 102 may generate correction information causing a correction to be made such that the smaller the rigidity of the carriage 12 and the smaller the damping ratio of the load vibration described above, the slower the feed speed of the table 8. In essence, the machining correction information generated by the output unit 102 need only be information that enables the control parameter described above to be corrected so as to reduce the load applied to the carriage 12 when machining of the workpiece 40 is being performed by the machining tool 31. The machining correction information generated in this manner is output from the output unit 102 to the NC device 30.

The output of the machining correction information by the output unit 102 may be performed when an amount of variation from a rigidity value or a damping ratio of the carriage 12 at the time of a previous output of the machining correction information is equal to or exceeds a prescribed amount. The prescribed amount during the output is an amount at which, when the amount of variation described above is smaller than the prescribed amount, a decline in machining accuracy of the workpiece 40 by the machining tool 31 conceivably stays within an allowable range. When an output condition of the machining correction information is determined in this manner, occurrences of hunting and overshoot during control of the machining tool 31 by the NC device 30 can be suppressed.

In addition, the output unit 102 may output alarm information related to the machining of the workpiece 40 to the NC device 30 when a period of time required for the amount of variation from the rigidity value or the damping ratio of the carriage 12 at the time of a previous output of the machining correction information to be equal to or exceed a prescribed amount (an integrated value of operation times of the machine tool 20) is shorter than a prescribed time. The prescribed time in this case is a period of time shorter than the period of time required for the amount of variation described above to be equal to or exceed a prescribed amount during a process of change over time of the motion guidance device 1 in a normal state and a period of time in which a decrease in a rigidity value or a damping ratio of the carriage 12 acquired by the acquisition unit 101 is conceivably caused by a factor other than a change in the motion guidance device 1 over time. In other words, the prescribed time is a period of time in which, conceivably, an abnormality has occurred due to a factor other than a change in the motion guidance device 1 over time. When alarm information is output from the output unit 102 to the NC device 30 on the basis of a prescribed time set as described above, the side of the NC device 30 can suspend machining of the workpiece 40 by the machining tool 31 and perform an inspection or a repair of the machine tool 20.

In a machining control system including the motion guidance device 1 described above, when the rigidity of the carriage 12 decreases due to a change in the motion guidance device 1 over time, the NC device 30 can correct a control parameter of the machining tool 31 using the machining correction information output from the output unit 102 of the motion guidance device 1. In doing so, by acquiring a load applied to the carriage 12 when machining of the workpiece 40 is performed by the machining tool 31 as prescribed machining information, a damping ratio of a load vibration generated in the carriage 12 can be acquired from the load and displacement information. In addition, by outputting the machining correction information generated on the basis of the damping ratio to the NC device 30, for example, the control parameter can be corrected so that the load applied to the motion guidance device 1 when machining of the workpiece 40 is performed by the machining tool 31 is reduced. In this case, a period required for the load vibration of the carriage 12 to be dampened can be prevented from becoming protracted due to a decrease in the rigidity of the carriage 12. As a result, destabilization of an attitude of the workpiece 40 can be suppressed when machining of the workpiece 40 is being performed by the machining tool 31. Therefore, a decline in the machining accuracy of the workpiece 40 due to a change in the motion guidance device 1 over time can be suppressed.

Although an example in which five components are acquired with respect to each of the rigidity of the carriage 12 and the damping ratio of the load vibration as the prescribed machining information has been described in the present embodiment, all of the five components need not be acquired and only components in accordance with a type of the machining tool 31 may be acquired.

REFERENCE SIGNS LIST

1 Motion guidance device
2a, 2b, 2c, 2d, 3a, 3b, 3c, 3d Displacement sensor
4 Linear encoder
8 Table
10 Information processing device
11 Rail
12 Carriage
15a, 15b Sensor mounting member
15-1 Horizontal part
15-2 Side part
16 Ball
20 Machine tool
30 NC device
31 Machining tool
32 Actuator
40 Workpiece

The invention claimed is:

1. A machining control system related to machining of a workpiece performed by a machining device in a state where the workpiece is movably supported by a motion guidance device having a track member which extends along a longitudinal direction and a moving member which is arranged so as to oppose the track member via a rolling element being rollably arranged inside a rolling groove and which is relatively movable along the longitudinal direction of the track member, the machining control system comprising:

the motion guidance device;
a table on which the workpiece is to be placed, the table being supported by the motion guidance device; and
a controller, wherein the controller
acquires information related to a damping ratio of a load vibration applied to the moving member when machining of the workpiece is being performed by the machining device as prescribed machining information; and
generates, on the basis of the prescribed machining information, machining correction information causing a correction to be made by a machining tool provided in the machining device such that a machining speed of the workpiece, and/or a feed speed of an actuator for feeding the table with respect to the machining tool, is made to become slower as the damping ratio of the load vibration becomes smaller, and outputs the generated machining correction information to the machining device.

2. The machining control system according to claim 1, wherein
the motion guidance device further includes a plurality of displacement sensors which detect displacements of the moving member in a prescribed number of displacement directions of the moving member, and
the controller acquires the prescribed machining information on the basis of detected values of the plurality of displacement sensors.

3. The machining control system according to claim 2, wherein,
when an amount of variation of the damping ratio is equal to or exceeds a prescribed amount in a history of the prescribed machining information, the controller generates the machining correction information and outputs the machining correction information to the machining device.

4. The machining control system according to claim 3, wherein,
when an amount of variation of the damping ratio is equal to or exceeds the prescribed amount, and a period of time required for the amount of variation of the damping ratio to be equal to or exceed the prescribed amount is shorter than a prescribed time, in a history of the prescribed machining information, the controller outputs alarm information related to the machining of the workpiece to the machining device.

5. A motion guidance device having a track member which extends along a longitudinal direction and a moving member which is arranged so as to oppose the track member via a rolling element being rollably arranged inside a rolling groove and which is relatively movable along the longitudinal direction of the track member, the motion guidance device comprising:
a plurality of displacement sensors which detect displacements of the moving member in a prescribed number of displacement directions of the moving member; and
a controller, wherein
the controller
acquires, on the basis of detected values of the plurality of displacement sensors of the motion guidance device, information related to a damping ratio of a load vibration applied to the moving member when machining of the workpiece is being performed by a machining device as prescribed machining information; and
generates, on the basis of the prescribed machining information, machining correction information causing a correction to be made by a machining tool provided in the machining device such that a machining speed of the workpiece, and/or a feed speed of an actuator for feeding the table with respect to the machining tool, is made to become slower as the damping ratio of the load vibration becomes smaller, and outputs the machining correction information to the machining device.

\* \* \* \* \*